United States Patent
Weston-Lewis

(10) Patent No.: US 12,273,425 B2
(45) Date of Patent: Apr. 8, 2025

(54) METHOD AND SYSTEM FOR HYPER-LOCALISATION OF APPLICATIONS

(71) Applicant: INFOSYS LIMITED, Bangalore (IN)

(72) Inventor: Sebastian Weston-Lewis, London (GB)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 18/238,466

(22) Filed: Aug. 26, 2023

(65) Prior Publication Data
US 2025/0071185 A1    Feb. 27, 2025

(51) Int. Cl.
*G06F 16/95* (2019.01)
*G06F 16/9537* (2019.01)
*H04L 67/52* (2022.01)

(52) U.S. Cl.
CPC .......... *H04L 67/52* (2022.05); *G06F 16/9537* (2019.01)

(58) Field of Classification Search
CPC .............................. H04L 67/52; G06F 16/9537
See application file for complete search history.

(56) References Cited

U.S. PATENT DOCUMENTS

| | | | | |
|---|---|---|---|---|
| 7,363,586 B1* | 4/2008 | Briggs | ..................... | G06F 9/454 715/746 |
| 7,636,656 B1* | 12/2009 | Nieh | ..................... | G06F 40/58 704/277 |
| 11,516,300 B2* | 11/2022 | Gillespie | ................. | H04L 67/01 |
| 2023/0137876 A1* | 5/2023 | Chalamalasetty | .... | G06F 3/0484 715/703 |
| 2024/0013155 A1* | 1/2024 | Cole | ................... | G06Q 10/1053 |

* cited by examiner

*Primary Examiner* — Loc Tran
(74) *Attorney, Agent, or Firm* — Finnegan, Henderson, Farabow, Garrett & Dunner LLP

(57) ABSTRACT

The disclosure relates to method and system for hyper-localization of an application. The method includes obtaining a first page associated with the application. The first page includes at least one element. The method includes receiving user input corresponding to the at least one element associated with the first page for a first predefined locale of a plurality of locales. Each of the plurality of locales includes at least one of a geography and a language. The method includes associating the first page with a hyper-localization database. The hyper-localization database includes information corresponding to the at least one element of a plurality of pages for the plurality of locales. The method includes extracting data associated with the at least one element based on the user input from the hyper-localization database; and generating a second page for the first predefined locale based on the extracted data and a schema of the first page.

20 Claims, 12 Drawing Sheets

Secure Checkout      Logout 602

Your Details 604
- Name 604a
- Surname 604b

Your address 606
- 1st line 606a
- 2nd line 606b
- 3rd line (optional) 606c
- City / town / village 606d
- Zip code 606e
- Country 606f: Select Country

Contact details 608
- Contact number 608a
- Email 608b

Shipping Option 610

Payment Options 612

Review 614

Subtotal 616

| | |
|---|---|
| Item 1 | $1.11 |
| Item 2 | $2.22 |
| Item 3 | $3.33 |
| Item 4 | $4.44 |
| Total | $11.1 |

Confirm Order 618

FIG. 6A

Secure Checkout — Logout 602

Your Details 604
Title 604c  Name 604a  Surname 604b

Your address 606
1st line 606a
2nd line 606b
City / town / village 606d
Postcode 606e'
[XXXX-XXX]
Country 606f
United Kingdom

Contact details 608
Contact number 608a
+44  [xxxxxxxxx]
Email 608b

Shipping Option 610

Payment Options 612

Review 614

Subtotal 616
| | |
|---|---|
| Item 1 | $1.11 |
| Item 2 | $2.22 |
| Item 3 | $3.33 |
| Item 4 | $4.44 |
| Total | $11.1 |

Confirm Order 618

FIG. 6B

Secure Checkout — Logout 602

Your Details 604

| Name 604a | Second name 604b |
|---|---|
| Luiz | Joao |

| Mother's Name 604d | Father's name 604e |
|---|---|
| Pazos | Da Silva |

Your address 606

Avenue / Street 606h    Number 606g

Neighborhood 606j

City 606d

State code 606k    Postal code 606l
                   [XXXX-XXX]

Country 606f
Brazil ▽

Contact details 608

Contact number 608a
+55▽  [xxxxxxxxx]

Email 608b

Shipping Option 610

Payment Options 612

Review 614

Subtotal 616

| Item 1 | ₺30.01 |
|---|---|
| Item 2 | ₺60.03 |
| Item 3 | ₺90.04 |
| Item 4 | ₺120.06 |
| Total | ₺300.15 |

Confirm Order 618

┌──────────────────────────────────────────────────────────┐
│              Secure Checkout         Logout 602          │
│ ┌──────────────────────────────────┐ ┌─────────────────┐ │
│ │ 你的资料 604                      │ │   Subtotal 616  │ │
│ │  姓名 604a      第二个名字 604b   │ │ Item 1  ₺30.01  │ │
│ │  [Luiz]         [Joao]            │ │ Item 2  ₺60.03  │ │
│ │  母亲的名字 604d 父亲的名字 604e  │ │ Item 3  ₺90.04  │ │
│ │  [Pazos]        [Da Silva]        │ │ Item 4  ₺120.06 │ │
│ └──────────────────────────────────┘ │ Total   ₺300.15 │ │
│ ┌──────────────────────────────────┐ └─────────────────┘ │
│ │ 你的地址 606                      │ ┌─────────────────┐ │
│ │  大道/街道 606h    数字 606g      │ │ Confirm Order 618│ │
│ │  [            ]   [       ]       │ └─────────────────┘ │
│ │  邻里 606j                        │                     │
│ │  [            ]                   │                     │
│ │  城市 606d                        │                     │
│ │  [            ]                   │                     │
│ │  州代码 606k      邮政编码 606l   │                     │
│ │  [       ]       [XXXX-XXX]       │                     │
│ │  国家 606f                        │                     │
│ │  [Brazil      ▽]                  │                     │
│ └──────────────────────────────────┘                     │
│ ┌──────────────────────────────────┐                     │
│ │ 联系方式 608                      │                     │
│ │  联系电话 608a                    │                     │
│ │  [+55▽] [xxxxxxxxx]               │                     │
│ │  电子邮件 608b                    │                     │
│ │  [             ]                  │                     │
│ └──────────────────────────────────┘                     │
│ ┌──────────────────────────────────┐                     │
│ │ 运输选项 610                      │                     │
│ └──────────────────────────────────┘                     │
│ ┌──────────────────────────────────┐                     │
│ │ 付款方式 612                      │                     │
│ └──────────────────────────────────┘                     │
│ ┌──────────────────────────────────┐                     │
│ │ 审查 614                          │                     │
│ └──────────────────────────────────┘                     │
└──────────────────────────────────────────────────────────┘

FIG. 6D
```

METHOD AND SYSTEM FOR HYPER-LOCALISATION OF APPLICATIONS

FIELD

The present disclosure relates to hyper-localization, and more particularly to a system and method for hyper-localization of an application.

BACKGROUND

The current state of localization capabilities in consumer and enterprise experiences is predominantly limited to the existing locale capabilities, with a primary focus on language, currency, and date formatting settings. These localization settings are often set according to the International Organization for Standardization (ISO) standards, which provide a standardized framework for various aspects of internationalization and localization. However, despite these efforts to cater to different locales, there are inherent limitations in the existing approach. The standard localization settings based on ISO standards are insufficient to fully address the preferences and requirements of users in specific countries and geographies. As a result, experiences are often served to customers with characteristics that may not be entirely relevant or tailored to their individual needs and cultural backgrounds.

The main issues with the current state of localization capabilities include lack of comprehensive localization, inadequate personalization, resource-intensive customization, and missed market opportunities. While the ISO standards cover essential elements like language, currency, and date formatting, they may not encompass the full spectrum of localization factors that influence user experiences. Cultural nuances, regional regulations, visual preferences, and other critical aspects may significantly impact how the users perceive and interact with a product or a service. Further, the limited localization settings may lead to a lack of personalization in consumer and enterprise experiences. The users may feel disconnected from the product or service if it does not resonate with their local customs, linguistic preferences, or cultural norms.

The present invention is directed to overcome one or more limitations stated above or any other limitations associated with the known arts.

SUMMARY

In one embodiment, a method of hyper-localization of an application is disclosed. In one example, the method may include obtaining a first page associated with the application. The first page may include at least one element. The method may further include receiving a user input corresponding to the at least one element associated with the first page for a first predefined locale of a plurality of locales. It should be noted that each of the plurality of locales may include at least one of a geography and a language. The method may further include associating the first page with a hyper-localization database. The hyper-localization database may include information corresponding to the at least one element of a plurality of pages for the plurality of locales. The method may further include extracting data associated with the at least one element based on the user input from the hyper-localization database. The method may further include generating a second page for the first predefined locale based on the extracted data and a schema of the first page.

In another embodiment, a system for hyper-localization of an application is disclosed. In one example, the system may include a processing circuitry and a memory communicatively coupled to the processing circuitry. The memory may store processor-executable instructions, which, on execution, may cause the processing circuitry to obtain a first page associated with the application. The first page may include at least one element. The processor-executable instructions, on execution, may further cause the processing circuitry to receive a user input corresponding to the at least one element associated with the first page for a first predefined locale of a plurality of locales. It should be noted that each of the plurality of locales may include at least one of a geography and a language. The processor-executable instructions, on execution, may further cause the processing circuitry to associate the first page with a hyper-localization database. The hyper-localization database may include information corresponding to the at least one element of a plurality of pages for the plurality of locales. The processor-executable instructions, on execution, may further cause the processing circuitry to extract data associated with the at least one element based on the user input from the hyper-localization database. The processor-executable instructions, on execution, may further cause the processing circuitry to generate a second page for the first predefined locale based on the extracted data and a schema of the first page.

In yet another embodiment, a non-transitory computer-readable medium storing computer-executable instructions for hyper-localization of an application is disclosed. The stored instructions, when executed by a processing circuitry, may cause the processing circuitry to perform operations including obtaining a first page associated with the application. The first page may include at least one element. The operations may further include receiving a user input corresponding to the at least one element associated with the first page for a first predefined locale of a plurality of locales. It should be noted that each of the plurality of locales may include at least one of a geography and a language. The operations may further include associating the first page with a hyper-localization database. The hyper-localization database may include information corresponding to the at least one element of a plurality of pages for the plurality of locales. The operations may further include extracting data associated with the at least one element based on the user input from the hyper-localization database. The operations may further include generating a second page for the first predefined locale based on the extracted data and a schema of the first page.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIGS. 6A-6D illustrate an exemplary generic page and hyper-localized pages generated using a hyper-localization database, in accordance with some embodiments of the present disclosure.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
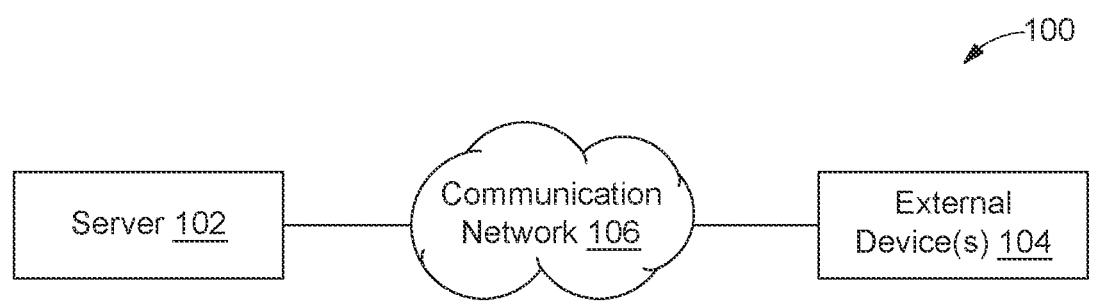
FIG. 1 illustrates a block diagram of an environment for hyper-localization of applications, in accordance with an exemplary embodiment of the present disclosure.

FIG. 1 is a block diagram that illustrates an environment 100 for hyper-localization of applications, in accordance with an exemplary embodiment of the present disclosure. An application may correspond to a computer application including a web application, a mobile application, or a web page. The application may also be referred to as an application program or an application software. The application may be a computer software package executing a particular function for an end user or, sometimes, for other applications. The application may be associated with a company, an enterprise, a service provider, or the like. The application may be, but is not limited to, a shopping application, a gaming application, a social media application, an entertainment application, or the like.

The environment 100 may include a server 102, and a plurality of external device(s) 104. An external device may be associated with a user/administrator. In some embodiments, the user may correspond to a developer. The server 102 and the plurality of external device(s) 104 are configured to communicate with each other via a communication network 106 for sending and receiving various data. Examples of the communication network 106 may include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and a combination thereof.

Examples of the plurality of external device(s) 104 may include, but are not limited to a server, a smartphone, an application server, a laptop, a desktop, a mobile phone, a smart wearable, or the like. Each of the plurality of external device(s) 104 may include a display which further includes a user interface (not shown in FIG. 1). By way of an example, the display may be used to display data (For example, a second page generated for a first predefined locale), to the developer. A locale may include a geography, a language, and a currency. For example, one locale may have the geography as "United Kingdom", the language as "English", and the currency as "Great Britain Pound (GBP)" and another locale may have the geography as "Brazil", the language as "English" and the currency as United States Dollar (USD). In some embodiments, the developer may interact with the server 102 using the user interface via the communication network 106. By way of an example, the user interface of the display may be used by the developer to provide inputs to the server 102. For example, the developer may input corresponding to at least one element associated with the first page for the first predefined locale of a plurality of locales. Also, each of the plurality of locales may have a corresponding unique identity (ID).

Examples of the at least one element may be, but are not limited to, a name format and a name sample, a currency format, a symbol and a sample amount, a date format and a sample date, a contact number format and a sample for contact number, an address format and a sample address, and a country name in a local language. Further, when the user, the administrator or the developer provides the input to the server 102 for hyper-localization of the application, in that case, the second page may be generated.

The server 102 may be configured for the hyper-localization of the application. In some embodiments, the server 102 may receive information from at least one of the plurality of external device(s) 104. Further, for hyper-localization of the application, the server 102 may perform various operations. For example, the operations may include obtaining a first page, receiving a user input, associating the first page with a hyper-localization database (not shown in FIG. 1), extracting data from the hyper-localization database, generating the second page, and the like. The server 102 may receive the first page associated with the application and the user input corresponding to the at least one element associated with the first page for a first predefined locale of a plurality of locales, from the at least one of the plurality of external device(s) 104.

Further, the server 102 may associate the first page with a hyper-localization database (not shown in FIG. 1). The hyper-localization database may include information corresponding to the at least one element of a plurality of pages for the plurality of locales. The server 102 may use the information to generate the second page for the first predefined locale based on data extracted from the hyper-localization database and a schema of the first page.

By way of an example, consider that the first page may be a checkout page of a shopping application. Further, the checkout page may include elements such as "Basic Details", "Address", "Contact Details", "Shipping Options", "Payment Options", and "Review". The checkout page may be associated with the first locale. The first locale may include a geography as "United Kingdom", a language as "English", and a currency as "GBP". Now, the developer may want to change a format of the element "Address". In that case, the developer may provide the input corresponding to the element "Address" to the server 102 via the user interface of the at least one external device. Further, the server 102 may perform various operations as mentioned above and generate the second page with modified formatting of the element "Address" for the first locale.

Further, in case the developer may want to change the language only to "Chinese", in that case the developer may provide the input corresponding to the language, and the second page may be generated for "United Kingdom, Chinese, GBP", which may be stored in the hyper-localization database for further use. Moreover, functionalities of the server 102 are further explained in detail in conjunction with FIG. 2.

Figure 2:
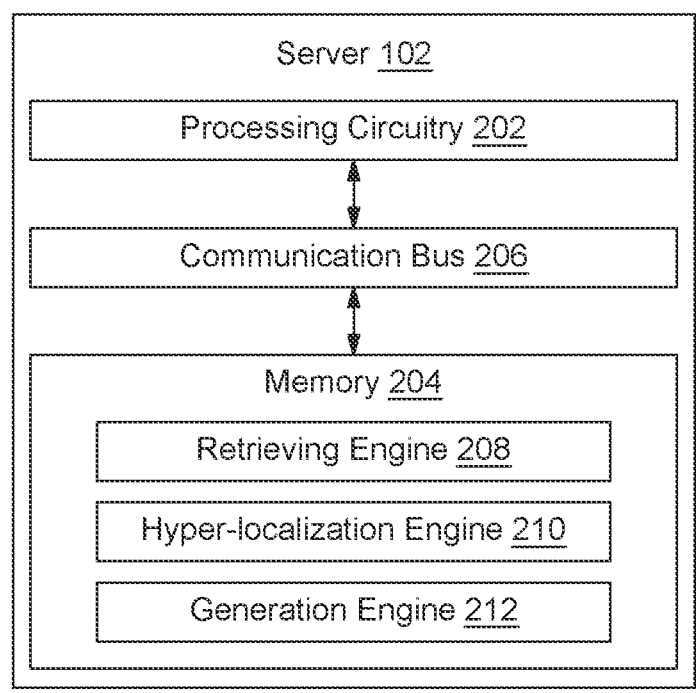
FIG. 2 illustrates a block diagram of various engines within a memory of a server configured for hyper-localization of an application, in accordance with some embodiments of the present disclosure.

FIG. 2 is a block diagram of various engines within the server 102 configured for hyper-localization of the application, in accordance with an exemplary embodiment of the present disclosure. FIG. 2 is explained in conjunction with FIG. 1.

The server 102 may include a processing circuitry 202, and a memory 204 communicatively coupled to the processing circuitry 202 via a communication bus 206. The memory 204 may store various data that may be captured, processed, and/or required by the server 102. The memory 204 may be a non-volatile memory (e.g., flash memory, Read Only Memory (ROM), Programmable ROM (PROM), Erasable PROM (EPROM), Electrically EPROM (EEPROM) memory, etc.) or a volatile memory (e.g., Dynamic Random Access Memory (DRAM), Static Random-Access memory (SRAM), etc.)

The memory 204 may also store processor-executable instructions. The processor-executable instructions, when executed by the processing circuitry 202, may cause the processing circuitry 202 to implement one or more embodiments of the present disclosure such as, but not limited to, obtaining a first page, receiving a user input, associating the first page with a hyper-localization database, extracting data from the hyper-localization database, generating a second page, and the like. The memory 204 may include a retrieving engine 208, a hyper-localization engine 210, and a generation engine 212. The memory 204 may also include a data store (not shown in FIG. 2) for storing data and intermediate results generated by the engines 208-212.

In some embodiments, the retrieving engine 208 in conjunction with the processing circuitry 202 may be configured to obtain a first page associated with the application. Here, the application may correspond to a web application, a mobile application, or a web page. The application may also be referred to as an application program or an application software. Examples of the application may include, but are not limited to, but are not limited to, a shopping application, a gaming application, a social media application, an entertainment application, or the like. Further, the first page may be any page of the application. For example, the first page may be a signup page, a checkout page, an order summary page, a dashboard, a profile page, a page for offered services (including the services along with their description, rates and other relevant details), a leaderboard page, and the like. In one embodiment, the first page may include at least one element. The at least one element may include a name format and a name sample, a currency format, a symbol and a sample amount, a date format and a sample date, a contact number element format and a sample number, an address format and a sample address, and a country name in a local language. In another embodiment, the first page may be a blank page with defined header and footer.

In some other embodiments, the retrieving engine 208 in conjunction with the processing circuitry 202 may also be configured to receive a user input. In one example, the user input may be provided by an application developer. The user input may be corresponding to the at least one element associated with the first page for a first predefined locale of a plurality of locales. For example, the user input may be provided corresponding to the name format and the name sample (i.e., the element name). It should be noted that each of the plurality of locales may include a geography, a language, and a currency. For example, the first predefined locale may include a geography-Brazil, a language-English, and a currency-Turkish Lire (TRY). The retrieving engine 208 may be communicatively coupled to the hyper-localization engine 210.

Further, the hyper-localization engine 210 in conjunction with the processing circuitry 202 may be configured to associate the first page with a hyper-localization database (not shown in FIG. 2). The hyper-localization database may be communicatively coupled to the server 102. The hyper-localization database may include information corresponding to each of the at least one element of a plurality of pages and for the plurality of locales. The hyper-localization database may be populated with the information corresponding to each of the at least one element of the plurality of pages for the plurality of locales through a Machine Learning (ML) technique/feedback mechanism and/or manually.

In some embodiments, the first page may be processed by the hyper-localization engine 210 to identify the first predefined locale associated with the first page of the application from the plurality of locales within the hyper-localization database, based on the user input. Further, the hyper-localization engine 210 in conjunction with the processing circuitry 202 may also be configured to extract data associated with the at least one element based on the user input from the hyper-localization database. The hyper-localization engine 210 may be operatively coupled to the generation engine 212.

The generation engine 212 in conjunction with the processing circuitry 202 may be configured to generate a second page for the first predefined locale. The second page may be generated based on the extracted data and a schema of the first page. By way of an example, in case of a blank page (i.e., the first page), the second page may be generated for the first predefined locale. By way of another example, in case of the first page having the at least one element, the second page may be generated for the first predefined locale with modifications in the at least one element. In this case, initially, the first page may also have a locale which may be the first predefined locale or any other locale. The developer may provide the user input of locale based on requirements. As a result of generation of the second page, the hyper-localization of the application may be achieved. In other words, a hyper-localized page (i.e., the second page) may be generated.

Further, the generation engine 212 may transmit the second page to the hyper-localization engine 210. It should be noted that the hyper-localization engine 210 may be configured to update the hyper-localization database. Thus, the hyper-localization engine 210 may store the second page in the hyper-localization database. The hyper-localization database may be updated based on at least one of addition of a new locale to the plurality of locales, modification of an existing locale within the plurality of locales, or elimination of an existing locale from the plurality of locales.

By way of example, consider a scenario when the original locale of the first page is different from the first predefined locale. In that case the first predefined locale may be considered as the new locale and added to the hyper-localization database. By way of another example, consider that the original locale of the first page is the first predefined locale and only modifications to the at least one element is performed. In that case, the first predefined locale is already existing locale and modifications of that existing locale may be performed and updated in the hyper-localization database. Further, in some embodiments, the developer may provide inputs to eliminate an existing locale. In that case the hyper-localization database may be updated by removing the existing locale from the plurality of locales present within the hyper-localization database. In some embodiments, the hyper-localization engine 210 may render the second page to the developer.

In some embodiments, the server 102 may receive a user selection corresponding to the second page associated with the first predefined locale. For example, the user selection may be received at run time from an application user/end-user. In that case, the second page may be rendered to the application user/end-user based on the user selection. By way of an example, the application user/end-user may select an option from a plurality of options displayed on application interface. In response to that the server 102 may retrieve a page from the hyper-localization database and the page based on the selected option.

It should be noted that all such aforementioned engines 208-212 may be represented as a single module or a combination of different modules. Further, as will be appreciated by those skilled in the art, each of the engines 208-212 may reside, in whole or in parts, on one device or multiple devices in communication with each other. In some embodiments, each of the engines 208-212 may be implemented as dedicated hardware circuit comprising custom application-specific integrated circuit (ASIC) or gate arrays, off-the-shelf semiconductors such as logic chips, transistors, or other discrete components. Each of the engines 208-212 may also be implemented in a programmable hardware device such as a field programmable gate array (FPGA), programmable array logic, programmable logic device, and so forth. Alternatively, each of the engines 208-212 may be implemented in software for execution by various types of processors (e.g., the processing circuitry 202). An identified module of executable code may, for instance, include one or more physical or logical blocks of computer instructions, which may, for instance, be organized as an object, procedure, function, or other construct. Nevertheless, the executables of an identified module or component need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for hyper-localization of an application. For example, the exemplary server 102 may generate the second page for the first predefined locale by the processes discussed herein. In particular, as will be appreciated by those of ordinary skill in the art, control logic and/or automated routines for performing the techniques and steps described herein may be implemented by the server 102 either by hardware, software, or combinations of hardware and software. For example, suitable code may be accessed and executed by the one or more processors on the server 102 to perform some or all of the techniques described herein. Similarly, application specific integrated circuits (ASICs) configured to perform some or all of the processes described herein may be included in the one or more processors on the server 102.

Figure 3:
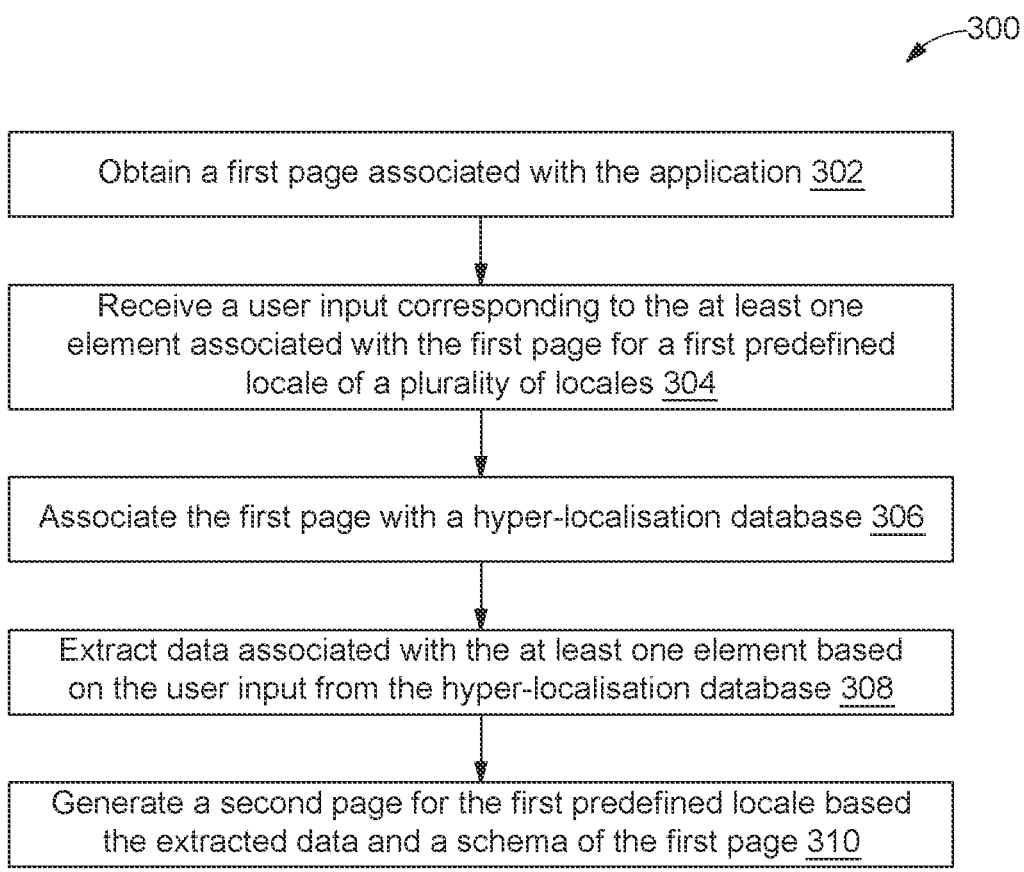
FIG. 3 illustrates a flow diagram of an exemplary process for hyper-localization of an application, in accordance with some embodiments of the present disclosure.

FIG. 3 is a flow diagram 300 that depicts an exemplary process for hyper-localization of the application, in accordance with an exemplary embodiment of the present disclosure. Each step of the process may be executed by a server (such as the server 102). FIG. 3 is explained in conjunction with FIGS. 1-2.

At step 302, a first page associated with the application may be obtained. For example, in a shopping application, the first page may be a checkout page. The first page may be obtained using a retrieving engine (such as the retrieving engine 208). The first page may include at least one element. In the above mentioned case, examples of the at least one element may include, but are not limited to, a name format and a name sample, a currency format, a symbol and a sample amount, a date format and a sample date, a contact number format and a sample for contact number, an address format and a sample address, and a country name in a local language.

At step 304, a user input corresponding to the at least one element associated with the first page may be received for a first predefined locale of a plurality of locales by the retrieving engine. In some embodiments, each of the plurality of locales may include at least one of a geography and a language. In some other embodiments, the each of the plurality of locales may also include a currency.

Thereafter, at step 306, the first page may be associated with a hyper-localization database. The hyper-localization database may include information corresponding to the at least one element of a plurality of pages for the plurality of locales. This step may be performed using a hyper-localization engine (such as the hyper-localization engine 210). It should be noted that each of the plurality of locales may have a corresponding unique identity (ID). Further, in some embodiments, the hyper-localization database may be created. It should be noted that the hyper-localization database may be populated with the information corresponding to the at least one element of the plurality of pages for the plurality of locales. The hyper-localization database may be populated based on a Machine Learning (ML) technique and/or manually. Further, in some embodiments, the hyper-localization database may be updated based on at least one of addition of a new locale to the plurality of locales, modification of an existing locale within the plurality of locales, or elimination of an existing locale from the plurality of locales.

In some embodiments, the first page associated with the application may be processed. Further, a first predefined locale associated with the first page of the application may be identified. At step 308, data associated with the at least one element may be extracted by the hyper-localization engine. The data may be extracted based on the user input from the hyper-localization database.

Thereafter, at step 310, a second page may be generated for the first predefined locale using a generation engine (such as the generation engine 212). The second page may be generated based on the extracted data and a schema of the first page. In some embodiments, a user selection corresponding to the second page associated with the first predefined locale may be received. Further, in response to receiving the user selection, the second page may be rendered to a corresponding user based on the user selection.

Figure 4:
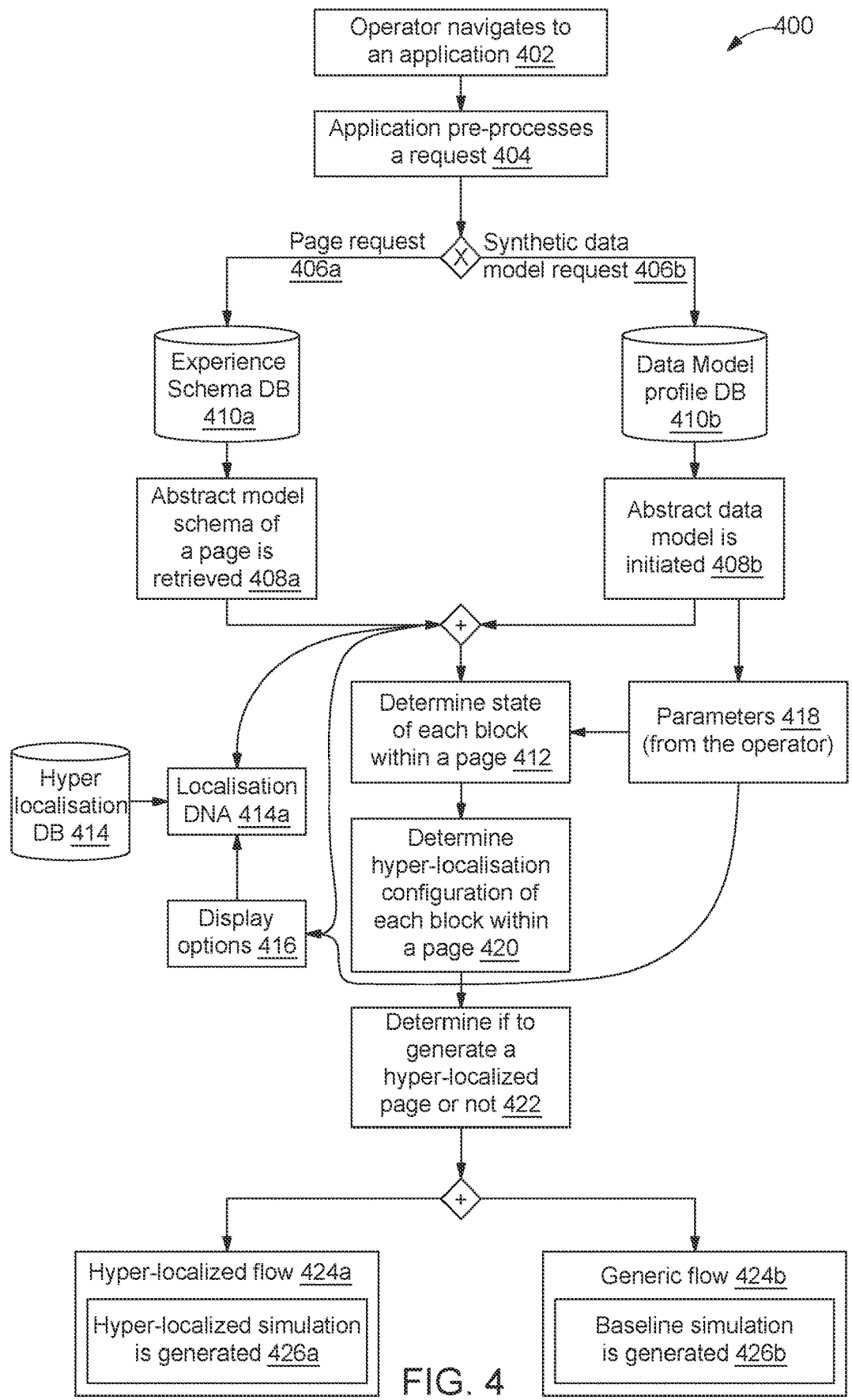
FIG. 4 illustrates an exemplary representation for hyper-localized experience generation during run-time, in accordance with some embodiments of the present disclosure.

FIG. 4 is an exemplary representation 400 for hyper-localized experience generation during run-time, in accordance with an exemplary embodiment of the present disclosure. FIG. 4 is explained in conjunction with FIGS. 1-3. At step 402, an operator may navigate to an application. Further, at step 404, the application may pre-process a request. The request may include a page request 406a and a synthetic data model request 406b. Further, at step 408a, based on the page request 406a, an abstract model schema of the page may be retrieved from an experienced schema database 410a. At step 408b, based on the synthetic data model request 406b, an abstract data model may be initiated from a data model profile database 410b.

Thereafter, at step 412 a state of each block within the page may be determined. For determination of the state, the abstract model schema, the abstract data model, a localization DNA 414a from a hyper-localization database 414, display options 416 may be considered. Also, parameters 418 from the operator to the application for the abstract data model may be considered for the state determination. Further, at step 420, hyper-localization configurations of the each block within the page may be determined based on the determined state. Thereafter, at step 422, it may be determined if generation of a hyper-localized page is required.

When the generation of the hyper-localized page is required a hyper-localized flow 424a and/or a generic flow 424b may be executed. In the hyper-localized flow 424a, at step 426a, a hyper-localized experience may be presented to an end-customer. Further, in the generic flow 424b, at step 426ba baseline experience may be presented to the end-customer.

Figure 5A:
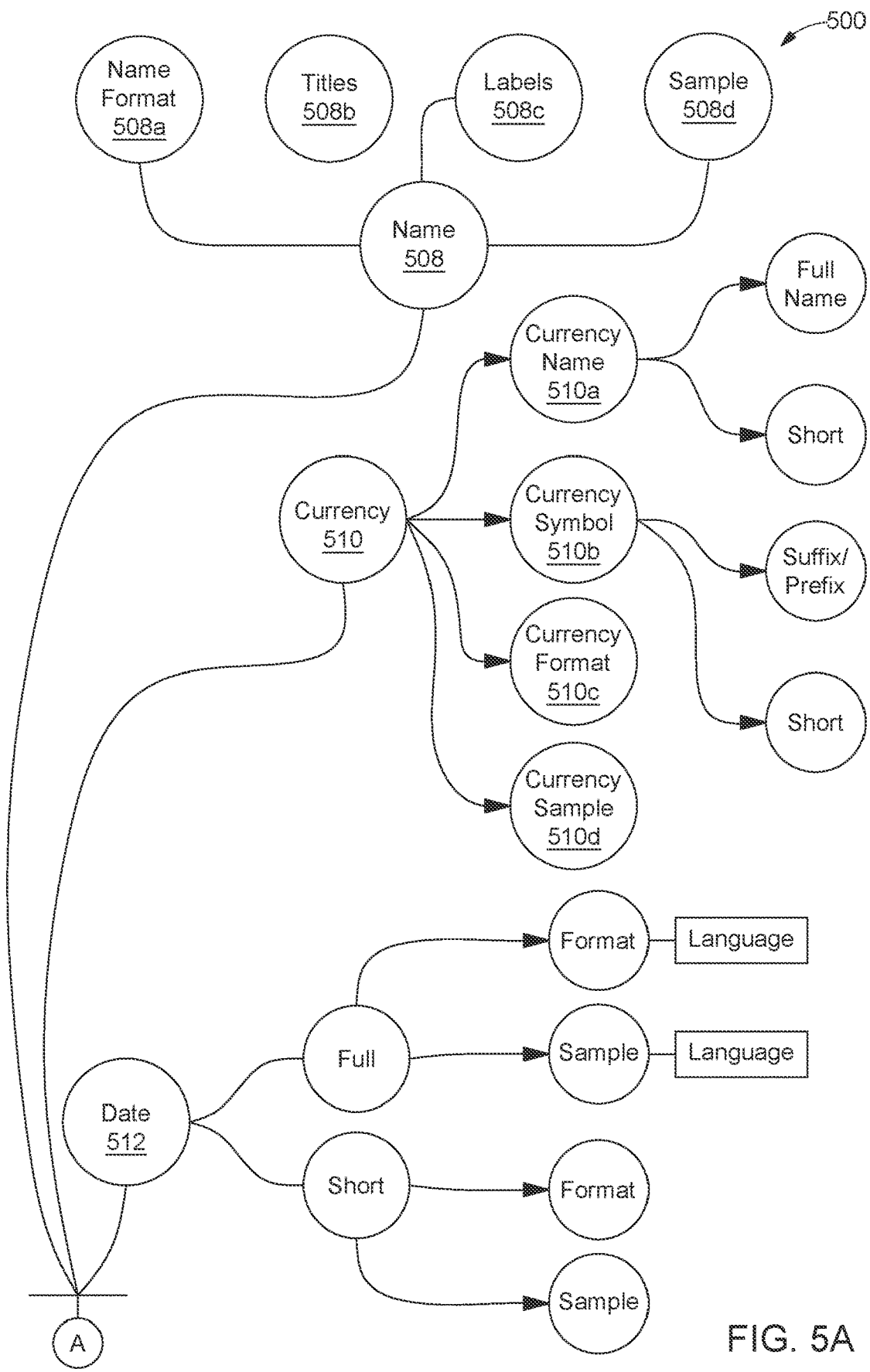
FIGS. 5A-5C illustrate exemplary data dimensions of locales within a hyper-localization database, in accordance with some embodiments of the present disclosure.
Figure 5B:
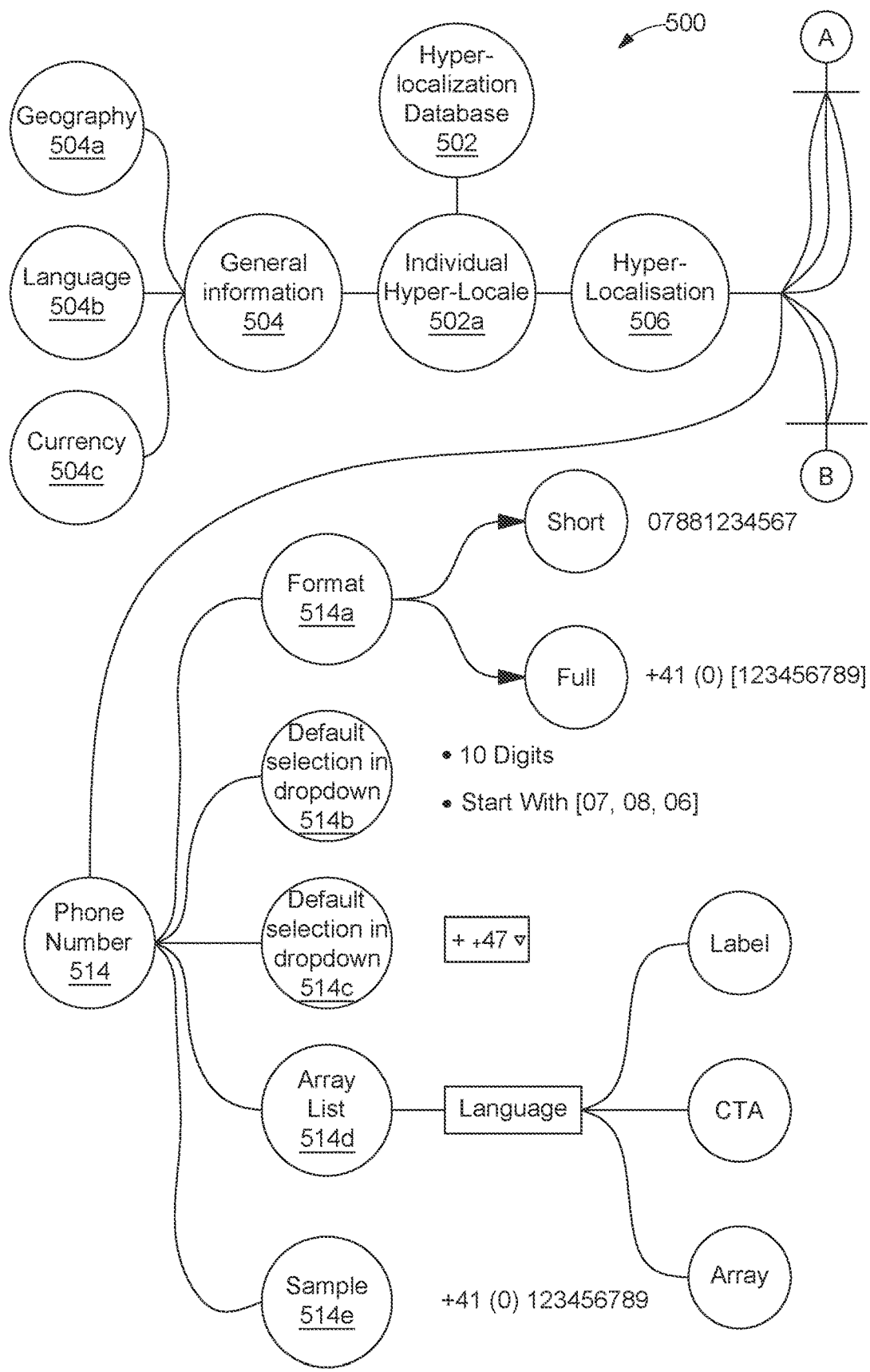
Figure 5C:
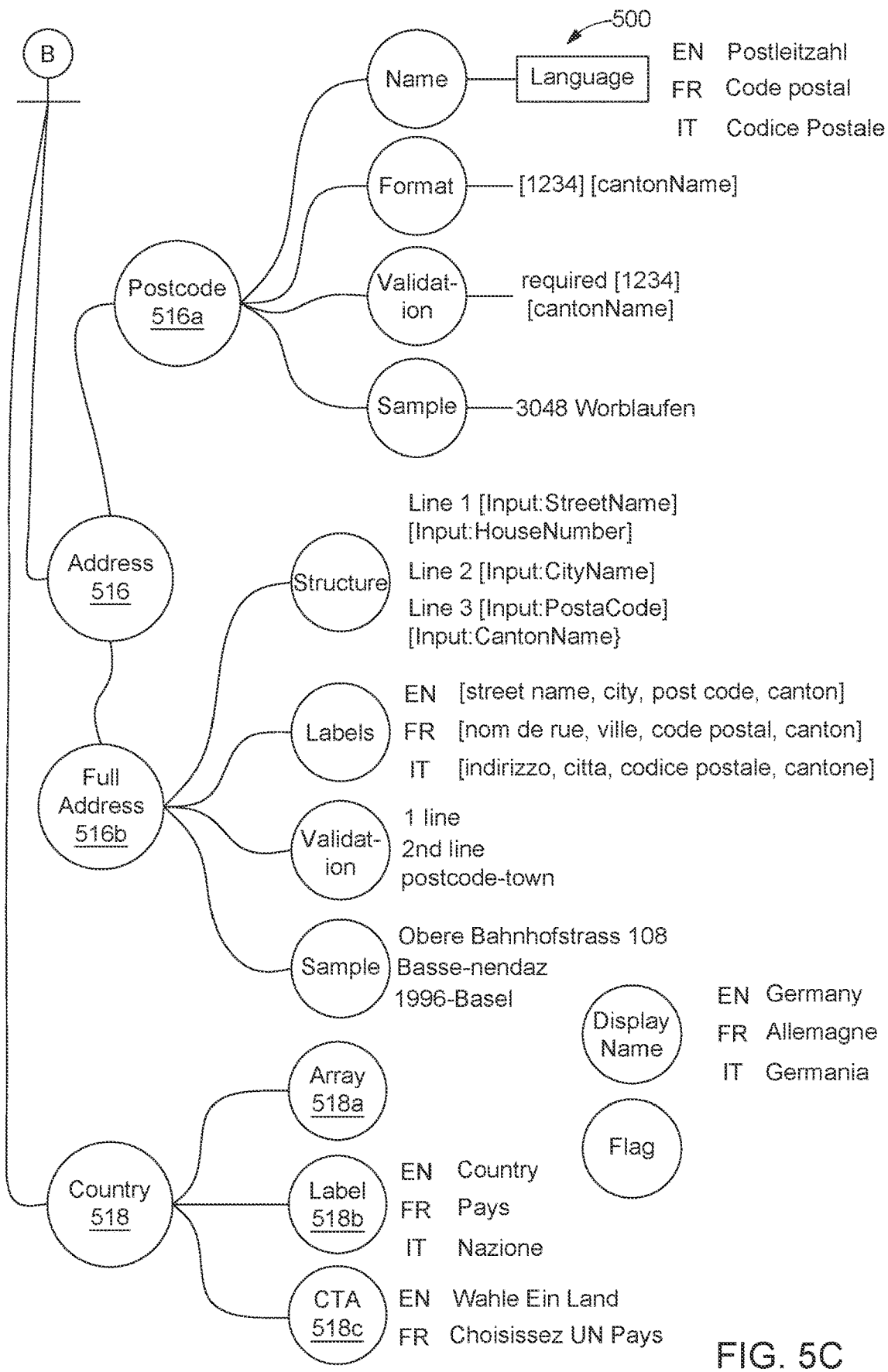

FIGS. 5A-5C are exemplary data dimensions 500 of locales within a hyper-localization database 502, in accordance with an exemplary embodiment of the present disclosure. FIGS. 5A-5C are explained in conjunction with FIGS. 1-4. The hyper-localization database 502 may be created by populating information (for example, general information 504 of each individual hyper-locale 502a) corresponding to elements of pages for the locales. The information may be populated through an ML model/feedback mechanism and/or manually. Also, the hyper-localization database 502 may be updated time-to-time based on an addition of a new locale to a plurality of locales, a modification of an existing locale within the plurality of locales, or an elimination of an existing locale from the plurality of locales. The information associated with the elements of the pages for the locales may include a geography 504a, a language 504b, and a currency 504c.

Further, for example, as illustrated in FIGS. 5A-5C, at least one element corresponding to which the user input may be obtained for the hyper-localization 506 may be one of a name 508, a currency 510, a date 512, a phone number 514, an address 516, and a country 518. The element name 508 may include a name format 508a (i.e., a structure of a name), for example [Title, Name, Surname], [Title, Surname, Name], [Title, Surname1, Surname2, Name], [Title, Name1, Name2, Surname1, Surname2], and the like. By way of an example, the name format 508a may be in such a way—[Title—Dr., Surname1—Anderson, Surname2—Ramirez, Name—Sofia].

Further, the element name 508 may include titles 508b, for example MR., MRS., MS., Miss, LORD, MASTER, DR., Prof., Sir, Madam, Rev. (Reverend), Capt. (Captain), Col. (Colonel), Sgt. (Sergeant), Dame, Imam, Sheikh, Hon. (Honorable), Pres. (President), Gov. (Governor), and the like. The element name 508 may further include labels 508c, for example [Title, Name, Surname], [First, Middle, Last], [Given, Middle, Family], [Forename, Middle, Surname], and the like. The element name 508 may include a name sample 508d (for example, a name sample "Jose Maria Gonzales Perreira"). In one example, the name sample 508d may be "Emily Johnson Martinez Thompson". In this example, the name format 508a may be in such a way that the word "Emily" is a first name, the word "Johnson" is surname1, the word "Martinez" is surname2, and the word "Thompson" is the last name.

The element currency 510 may include a currency name 510a (for example, a full name (United States Dollar) or a short name (USD)), a currency symbol 510b (For example, with suffix/prefix ([$] [amount]) or only symbol ([$])), a currency format 510c (for example, [X], [XXX], [XXX].[XX]—9,999,999.00, and a currency sample 510d (for example, 9.99). The element date 512 may include a full date 512a including a format and a sample. For example, the formats [DD]-[MonthName]-[YYYY], [DD]-[nomMois]-[YYYY], [DD]-[nomeMese]-[YYYY], and the like. The sample may be 4 Mar. 2023, 04-Mars-2023, 04-Marzo-2023, and the like. Further, the element date 512 may include a short date including a format and a sample. For example, the format may be [DD]/[MM]/[YYYY], and the sample may be 01/1/[NextYear].

The element phone number 514 may include a format 514a (i.e., a short format (e.g., 07881234567), or a full format (e.g., +41(0) [1234567890])), a default selection in a first dropdown 514b (i.e., 10 digits and starting with [07, 08, 06]), a default selection in a second dropdown 514c (for example, +41,+91, and the like), an array list 514d (i.e., language (label, Call to Action (CTA), and array), and a sample (for example, +41 (0) 123456789). The element address 516 may include a postcode 516a including a name (for example, code postal, postleitzahl, codice postale, and the like), a format (for example, [1234] [CantonName]), a validation (required [1234] [CantonName]), and a sample (for example, 3048 Worblaufen). Further, the element address 516 may include a full address 516b including a structure (for example, Line 1 [Input: StreetName] [Input: HouseNumber], Line 2 [Input: CityName], Line 3 [Input: PostalCode] [Input: CantonName]), labels ([StreetName, City, Postcode, Canton], [nom de rue, ville, code postal, canton], [indirizzo, citta, codice postale, cantone], and the like), a validation ($1^{st}$ line, $2^{nd}$ line, Postcode-town), and a sample. Example of the sample, for the element address 516<full address 516b, is given below:

Obere Bahnhofstrasse 108
Basse-nendaz
1996-Bases

Further, the element country 518 may include an array list 518a including a display name (for example, Germany, Allemagne, Germania, and the like) and a corresponding flag, a label 518b (for example, Country, pays, Nazione, and the like), and CTA 518c (for example, wahle ein land, choisissez un pays, seleziona un paese, and the like).

FIGS. 6A-6D illustrate an exemplary generic page 600A, and hyper-localized pages 600B, 600C. 600D generated using a hyper-localization database (same as the hyper-localization database 502), in accordance with an exemplary embodiment of the present disclosure. FIGS. 6A-6D are explained in conjunction with FIGS. 1-5. As illustrated in FIG. 6A, the generic page 600A may correspond to a secure checkout page. The generic page 600A may include a logout button 602 at the top right corner of the generic page 600A. A user may logout by clicking on this logout button 602. Further, the generic page 600A may include elements such as your details 604, your address 606, contact details 608, shipping option 610, payment options 612, review 614, and subtotal 616.

he element your details 604 includes a name block 604a, and a surname block 604b. The element your address 606 includes a $1^{st}$ line block 606a, a $2^{nd}$ line block 606b, a $3^{rd}$ line (optional) block 606c, a city/town/village block 606d, a zip code block 606e, and a county selection option 606f. The element contact details 608 includes a contact number 608a which furthera a county code selection option and a block to enter contact number. The element contact details 608 also includes an email block 608b for entering an email address.

Further, the element subtotal 616 includes details such as item names added to cart, corresponding rates, and a total amount. For example, element subtotal 616 includes four items (i.e., an item 1, an item 2, an item 3, and an item 4), their respective rates (such as $1.11, $2.22, $3.33, and $4.44), and the total amount for the four items (such as $11.1). Further, the generic page 600A may include a confirm order button 618.

Referring now to FIG. 6B, the hyper-localized page 600B is illustrated. The hyper-localized page 600B may be generated using the hyper-localization database. The process of generating the second page or hyper-localized page has already been explained in FIG. 3. The same process may be used to generate the hyper-localized pages 600B, 600C, and 600D. For example, in some embodiments, the generic page 600A may be obtained. Further, in some embodiments, a user input corresponding to the elements your details 604, and your address 606 associated with the generic page 600A for a non-ISO locale may be received. By way of an example, the non-ISO locale may include a geography—United Kingdom, a language—English, a currency—USD. Further, the generic page 600A may be associated with the hyper-localization database to extract data associated with the elements your details 604, and your address 606, for the non-ISO locale (United Kingdom, English, USD). Further, a second page (i.e., the hyper-localized page 600B) may be generated for the non-ISO locale (United Kingdom, English, USD). Thus, the generated hyper-localized page 600B includes modified blocks in the elements your details 604, and your address 606. The element your details 604 within the hyper-localized page 600B includes an extra block 604*c* for title, when compared with the generic page 600A. Further, the element your address 606 within the hyper-localized page 600B includes lesser blocks as formatting is changed. The 3$^{rd}$ line block 606*c* is removed and the zipcode block 606*e* is replaced with a postcode block 606*e*'. The element subtotal 616 includes same number of blocks and currency values.

Referring now to FIG. 6C, the hyper-localized page 600C is illustrated. As explained in FIG. 6B, in some embodiments, the generic page 600A may be obtained. Further, in some embodiments, the user input corresponding to the elements your details 604, your address 606, and subtotal 616 associated with the generic page 600A for another non-ISO locale may be received. By way of an example, the non-ISO locale may include a geography—Brazil, a language—English, a currency—TRY (Turkish Lira). Further, the generic page 600A may be associated with the hyper-localization database to extract data associated with the elements your details 604, your address 606, and subtotal 616 for the non-ISO locale (Brazil, English, TRY). Further, a second page (i.e., the hyper-localized page 600C) may be generated for the non-ISO locale (Brazil, English, TRY). Thus, the generated hyper-localized page 600C includes modified blocks for elements your details 604, your address 606, and subtotal 616. The element your details 604 within the hyper-localized page 600C includes extra blocks (i.e., a mother's name block 604*d* and a father's name block 604*e*), when compared with the generic page 600A. Further, the element your address 606 within the hyper-localized page 600C includes a number block 606*g*, an avenue block 606*h*, a neighborhood block 606*j*, a city/town/village block 606*d*, a state code block 606*k*, a postalcode block 606*l*, and a country block 606*f*. The element subtotal 616 includes same number of blocks as in the generic page 600A but modified currency values. For example, the rates in the hyper-localized page are ₺ 30.01, ₺ 60.03, ₺ 90.04, ₺ 120.06 for the item1, item2, item3 and item4, respectively. Similarly, the total amount is changed to ₺ 300.15.

Referring now to FIG. 6D, the hyper-localized page 600D is illustrated. As explained in FIGS. 6B and 6C, in some embodiments, the generic page 600A may be obtained. Further, in some embodiments, the user input corresponding to the elements your details 604, your address 606, shipping option 610, payment option 612, review 614, and subtotal 616 associated with the generic page 600A for another non-ISO locale may be received. By way of an example, the non-ISO locale may include a geography—Brazil, a language—Chinese, a currency—TRY (Turkish Lira). Further, the generic page 600A may be associated with the hyper-localization database to extract data associated with the elements your details 604, your address 606, contact details, 608, shipping option 610, payment option 612, review 614, and subtotal 616 for the non-ISO locale (Brazil, Chinese, TRY). Further, a second page (i.e., the hyper-localized page 600D) may be generated for the non-ISO locale (Brazil, Chinese, TRY). Thus, the generated hyper-localized page 600D includes modified blocks for elements your details 604, your address 606, contact details, 608, shipping option 610, payment option 612, review 614, and subtotal 616. As illustrated in FIG. 6D, language of the element your details 604 is changed to Chinese, for example your details 604 is now 你的资料 604. Further, the element your details 604 within the hyper-localized page 600D includes extra blocks (i.e., a mother's name (母亲的名字) block 604*d* and a father's name (父亲的名字) block 604*e*) when compared with the generic page 600A. Further, language of the element your address 606 is changed to Chinese, for example, your address 606 is now 你的地址 606. The element your address 606 within the hyper-localized page 600D includes a number (数字) block 606*g*, an avenue (大街) block 606*h*, a neighborhood (邻里) block 606*j*, a city/town/village (市/镇/村) block 606*d*, a state code (州代码) block 606*k*, and a postalcode (邮政编码) block 606*l*, and a country (国家) block 606*f*. Further, the hyper-localized page 600D includes same number of blocks for the elements contact details 608, shipping option 610, payment option 612, review 614, in Chinese language such as 联系方式 608, 运输选项 610, 付款方式 612, and 审查 614. The element subtotal 616 includes same number of blocks but modified currency values. The hyper-localized page 600D is similar to the hyper-localized page 600C in the Chinese language. For example, the rates in the hyper-localized page 600D are ₺ 30.01, ₺ 60.03, ₺ 90.04, ₺ 120.06 for the item1, item2, item3 and item4, respectively. Similarly, the total amount is changed to ₺ 300.15. Here, three exemplary hyper-localized pages 600B, 600C, 600D are explained, however there may be other scenarios where the hyper-localized pages may be generated for different locales. For example, for a locale including United Kingdom, Chinese, USD, the generated hyper-localized page may be similar to the hyper-localized page 600B but in the Chinese language.

Figure 7:
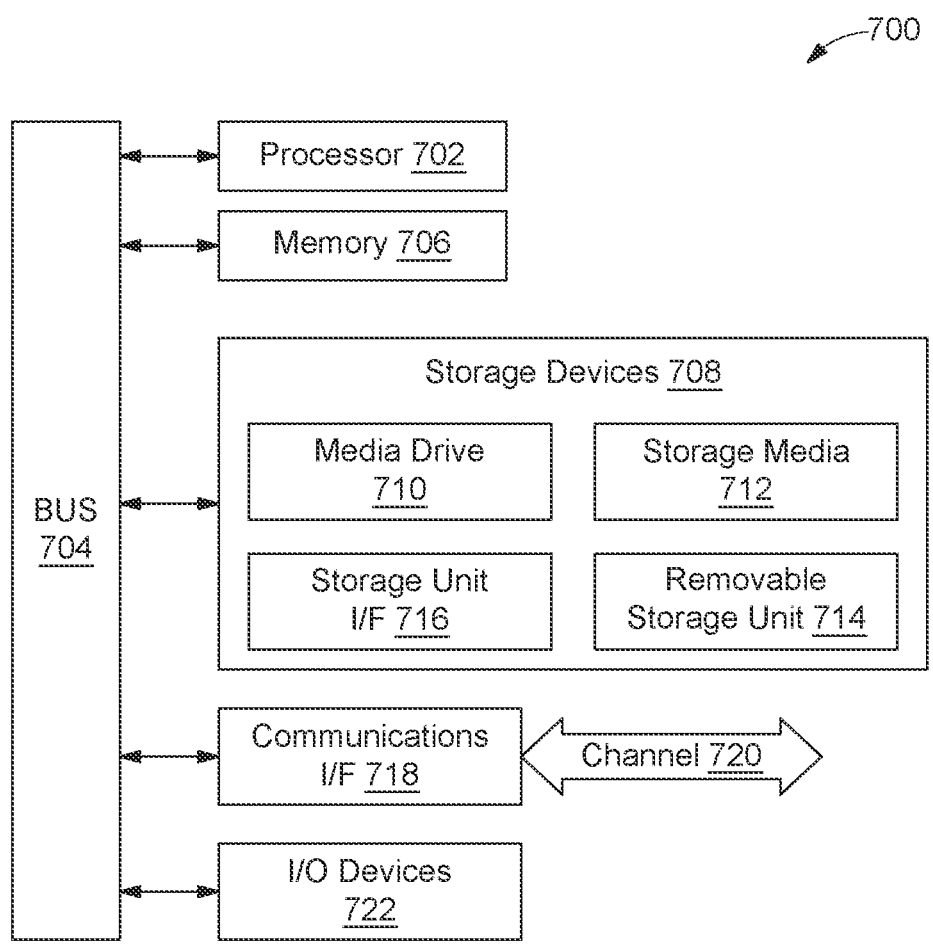
FIG. 7 illustrates a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 7, an exemplary computing system 700 that may be employed to implement processing functionality for various embodiments (e.g., as a SIMD device, client device, server device, one or more processors, or the like) is illustrated. Those skilled in the relevant art will also recognize how to implement the invention using other computer systems or architectures. The computing system 700 may represent, for example, a user device such as a desktop, a laptop, a mobile phone, personal entertainment device, DVR, and so on, or any other type of special or general-purpose computing device as may be desirable or appropriate for a given application or environment. The computing system 700 may include one or more processors, such as a processor 702 that may be implemented using a general or special purpose processing engine such as, for example, a microprocessor, microcontroller or other control logic. In this example, the processor 702 is connected to a bus 704 or other communication medium. In some embodiments, the processor 702 may be an AI processor, which may be implemented as a Tensor Processing Unit (TPU), or a graphical processor unit, or a custom programmable solution Field-Programmable Gate Array (FPGA).

The computing system 700 may also include a memory 706 (main memory), for example, Random Access Memory (RAM) or other dynamic memory, for storing information and instructions to be executed by the processor 702. The memory 706 also may be used for storing temporary variables or other intermediate information during execution of instructions to be executed by the processor 702. The computing system 700 may likewise include a read only memory ("ROM") or other static storage device coupled to bus 704 for storing static information and instructions for the processor 702.

The computing system 700 may also include a storage device 708, which may include, for example, a media drives 710 and a removable storage interface. The media drive 710 may include a drive or other mechanism to support fixed or removable storage media, such as a hard disk drive, a floppy disk drive, a magnetic tape drive, an SD card port, a USB port, a micro USB, an optical disk drive, a CD or DVD drive (R or RW), or other removable or fixed media drive. A storage media 712 may include, for example, a hard disk, magnetic tape, flash drive, or other fixed or removable medium that is read by and written to by the media drive 710. As these examples illustrate, the storage media 712 may include a computer-readable storage medium having stored there in particular computer software or data.

In alternative embodiments, the storage devices 708 may include other similar instrumentalities for allowing computer programs or other instructions or data to be loaded into the computing system 700. Such instrumentalities may include, for example, a removable storage unit 714 and a storage unit interface 716, such as a program cartridge and cartridge interface, a removable memory (for example, a flash memory or other removable memory module) and memory slot, and other removable storage units and interfaces that allow software and data to be transferred from the removable storage unit 714 to the computing system 700.

The computing system 700 may also include a communications interface 718. The communications interface 718 may be used to allow software and data to be transferred between the computing system 700 and external devices. Examples of the communications interface 718 may include a network interface (such as an Ethernet or other NIC card), a communications port (such as for example, a USB port, a micro USB port), Near field Communication (NFC), etc. Software and data transferred via the communications interface 718 are in the form of signals which may be electronic, electromagnetic, optical, or other signals capable of being received by the communications interface 718. These signals are provided to the communications interface 718 via a channel 720. The channel 720 may carry signals and may be implemented using a wireless medium, wire or cable, fiber optics, or other communications medium. Some examples of the channel 720 may include a phone line, a cellular phone link, an RF link, a Bluetooth link, a network interface, a local or wide area network, and other communications channels.

The computing system 700 may further include Input/Output (I/O) devices 22. Examples may include, but are not limited to a display, keypad, microphone, audio speakers, vibrating motor, LED lights, etc. The I/O devices 722 may receive input from a user and also display an output of the computation performed by the processor 702. In this document, the terms "computer program product" and "computer-readable medium" may be used generally to refer to media such as, for example, the memory 706, the storage devices 708, the removable storage unit 714, or signal(s) on the channel 720. These and other forms of computer-readable media may be involved in providing one or more sequences of one or more instructions to the processor 702 for execution. Such instructions, generally referred to as "computer program code" (which may be grouped in the form of computer programs or other groupings), when executed, enable the computing system 700 to perform features or functions of embodiments of the present invention.

In an embodiment where the elements are implemented using software, the software may be stored in a computer-readable medium and loaded into the computing system 700 using, for example, the removable storage unit 714, the media drive 710 or the communications interface 718. The control logic (in this example, software instructions or computer program code), when executed by the processor 702, causes the processor 702 to perform the functions of the invention as described herein.

Thus, the present disclosure may overcome drawbacks of traditional systems as discussed before. The present disclosure helps in hyper-localization of experiences, going beyond International Organization for Standardization (ISO), in order to make it relevant to an end-user or customer in any geography or zone. Further, for hyper-localization, locale dimensions may be abstracted and structured as "Strands" into an evolving localization database. The locale dimensions may include various factors like language, cultural preferences, local regulations, currency, and any other attributes that may impact the end user experiences. The locale dimensions and strands may be evolved and augmented over time. In other words, as the system evolves and gathers more information, the strands may be refined, expanded, and updated to provide increasingly accurate and relevant hyper-localized experiences. It may be noted that the localization database may be accessed both at design-time as well as run-time. At the run-time, the hyper-localized experience may be generated by combining an end-customer data profile with the abstract schema and the localization database. Overall, the disclosure enables more hyper-localized and relevant experiences for users across different geographies and zones, as it takes into account various locale dimensions and tailors the experiences, ultimately enhancing user satisfaction and engagement.

The disclosure may enhance localization capabilities of consumers and enterprise experiences. The disclosure helps in going beyond the traditional ISO-based approach. The disclosure provides flexible, dynamic, and efficient localization, enabling businesses to serve their customers with relevant, personalized experiences that resonate with their individual cultural and regional characteristics.

The present disclosure may be applicable in various fields including retail, commerce, telecom, media, insurance, automotive, financial services, travel, transportation, logistics, real estate, public & social sector, sports, energy, mining, industries, healthcare, education, and consumer packaged goods. For example, on a customer website, the hyper-localized experience may be generated corresponding to a decisional experience, a transactional experience, an educational experience, a browsing & consumption experience, and an assistive experience.

By way of an example, on an enterprise website (internal/public), the hyper-localized experience may be generated corresponding to a transactional experience, an educational experience, a browsing & consumption experience, and an assistive experience. Further, on a consumer web application (internal/public), the hyper-localized experience may be generated corresponding to a decisional experience, a transactional experience, an educational experience, a browsing & consumption experience, and an assistive experience. On an enterprise web application (internal/public), the hyper-localized experience may be generated corresponding to a decisional experience, a transactional experience, an educational experience, a browsing & consumption experience, and an assistive experience. Further, on an instore display application (internal/public), the hyper-localized experience may be generated corresponding to a decisional experience, a transactional experience, an educational experience, a browsing & consumption experience, and an assistive experience.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

I claim:

1. A method of hyper-localization of an application, the method comprising:
    obtaining, by a server, a first page associated with the application, wherein the first page comprises at least one element, and wherein the at least one element comprises a first set of blocks;
    receiving, by the server, a user input corresponding to the at least one element associated with the first page for a first predefined locale of a plurality of locales, wherein each of the plurality of locales comprises at least a geography and a language;
    associating, by the server, the first page with a hyper-localization database, wherein the hyper-localization database comprises information corresponding to the at least one element of a plurality of pages for the plurality of locales;
    extracting, by the server, based on the association of the first page with the hyper-localization database, data associated with the at least one element based on the user input from the hyper-localization database, wherein the data associated with the at least one element for the first predefined locale is indicative of a second set of blocks; and
    generating, by the server, a second page, including the at least one element, for the first predefined locale based on the extracted data and a schema of the first page, wherein the at least one element in the second page is modified to comprise the second set of blocks.

2. The method of claim 1, wherein the plurality of locales further comprises a currency.

3. The method of claim 1, wherein the at least one element further comprises a name format and a name sample, a currency format, a symbol and a sample amount, a date format and a sample date, a contact number element format and a sample number, an address format and a sample address, and a country name in a local language.

4. The method of claim 1, further comprising creating the hyper-localization database, wherein the creating comprises:
    populating the hyper-localization database with the information corresponding to the at least one element of the plurality of pages for the plurality of locales, wherein the hyper-localization database is populated based on a Machine Learning (ML) technique.

5. The method of claim 1, further comprising updating, by the server, the hyper-localization database based on at least one of:
    addition of a new locale to the plurality of locales;
    modification of an existing locale within the plurality of locales; or
    elimination of an existing locale from the plurality of locales.

6. The method of claim 1, wherein each of the plurality of locales comprises a corresponding unique identity (ID).

7. The method of claim 1, further comprising processing, by the server, the first page associated with the application, wherein the processing comprises:
    identifying, by the server, the first predefined locale associated with the first page of the application from the plurality of locales, based on the user input.

8. The method of claim 1, further comprising:
    receiving, by the server, a user selection corresponding to the second page associated with the first predefined locale; and
    rendering, by the server, the second page to a user based on the user selection.

9. A system for hyper-localization of an application, the system comprising:
    processing circuitry; and
    a memory communicatively coupled to the processing circuitry, wherein the memory stores processor-executable instructions, which, on execution by the processing circuitry, cause the processing circuitry to:

obtain a first page associated with the application, wherein the first page comprises at least one element, and wherein the at least one element comprises a first set of blocks;

receive a user input corresponding to the at least one element associated with the first page for a first predefined locale of a plurality of locales, wherein each of the plurality of locales comprises at least a geography and a language;

associate the first page with a hyper-localization database, wherein the hyper-localization database comprises information corresponding to the at least one element of a plurality of pages for the plurality of locales;

extract, based on the association of the first page with the hyper-localization database, data associated with the at least one element based on the user input from the hyper-localization database, wherein the data associated with the at least one element for the first predefined locale is indicative of a second set of blocks; and generate a second page, including the at least one element, for the first predefined locale based on the extracted data and a schema of the first page, wherein the at least one element in the second page is modified to comprise the second set of blocks.

10. The system of claim 9, wherein the plurality of locales further comprises a currency.

11. The system of claim 9, wherein the at least one element further comprises a name format and a name sample, a currency format, a symbol and a sample amount, a date format and a sample date, a contact number element format and a sample number, an address format and a sample address, and a country name in a local language.

12. The system of claim 9, wherein the processor-executable instructions further cause the processing circuitry to create the hyper-localization database by:
   populating the hyper-localization database with the information corresponding to the at least one element of the plurality of pages for the plurality of locales, wherein the hyper-localization database is populated based on a Machine Learning (ML) technique.

13. The system of claim 9, wherein the processor-executable instructions further cause the processing circuitry to update the hyper-localization database based on at least one of:
   addition of a new locale to the plurality of locales;
   modification of an existing locale within the plurality of locales; or
   elimination of an existing locale from the plurality of locales.

14. The system of claim 9, wherein each of the plurality of locales comprises a corresponding unique identity (ID).

15. The system of claim 9, wherein the processor-executable instructions further cause the processing circuitry to process the first page associated with the application for:
   identifying the first predefined locale associated with the first page of the application from the plurality of locales, based on the user input.

16. The system of claim 9, wherein the processor-executable instructions further cause the processing circuitry to:

receive a user selection corresponding to the second page associated with the first predefined locale; and
render the second page to a user based on the user selection.

17. A non-transitory computer-readable medium storing computer-executable instructions for hyper-localization of an application, the stored computer-executable instructions, when executed by a processing circuitry, cause the processing circuitry to perform operations comprising:
   obtaining a first page associated with the application, wherein the first page comprises at least one element, and wherein the at least one element comprises a first set of blocks;
   receiving a user input corresponding to the at least one element associated with the first page for a first predefined locale of a plurality of locales, wherein each of the plurality of locales comprises at least one of a geography and a language;
   associating the first page with a hyper-localization database, wherein the hyper-localization database comprises information corresponding to the at least one element of a plurality of pages for the plurality of locales;
   extracting, based on the association of the first page with the hyper-localization database, data associated with the at least one element based on the user input from the hyper-localization database, wherein the data associated with the at least one element for the first predefined locale is indicative of a second set of blocks; and
   generating a second page, including the at least one element, for the first predefined locale based on the extracted data and a schema of the first page, wherein the at least one element in the second page is modified to comprise the second set of blocks.

18. The non-transitory computer-readable medium of the claim 17, wherein the computer-executable instructions further configured for creating the hyper-localization database by:
   populating the hyper-localization database with the information corresponding to the at least one element of the plurality of pages for the plurality of locales, wherein the hyper-localization database is populated based on a Machine Learning (ML) technique.

19. The non-transitory computer-readable medium of the claim 17, wherein the computer-executable instructions further configured for updating the hyper-localization database based on at least one of:
   addition of a new locale to the plurality of locales;
   modification of an existing locale within the plurality of locales; or
   elimination of an existing locale from the plurality of locales.

20. The non-transitory computer-readable medium of the claim 17, wherein the computer-executable instructions further configured for:
   receiving a user selection corresponding to the second page associated with the first predefined locale; and
   rendering the second page to a user based on the user selection.

* * * * *